United States Patent
Saxena et al.

(10) Patent No.: US 12,488,486 B2
(45) Date of Patent: Dec. 2, 2025

(54) METHOD FOR ESTIMATING FLUID SATURATION OF A ROCK

(71) Applicant: SHELL USA, INC., Houston, TX (US)

(72) Inventors: Nishank Saxena, Houston, TX (US); Faruk Ömer Alpak, Houston, TX (US); Amie Marie Hows, Houston, TX (US); John Justin Freeman, Houston, TX (US); Bochao Zhao, Houston, TX (US)

(73) Assignee: SHELL USA, INC.

( * ) Notice: Subject to any disclaimer, the term of this patent is extended or adjusted under 35 U.S.C. 154(b) by 545 days.

(21) Appl. No.: 17/912,318

(22) PCT Filed: Apr. 21, 2021

(86) PCT No.: PCT/US2021/028299
§ 371 (c)(1),
(2) Date: Sep. 16, 2022

(87) PCT Pub. No.: WO2021/216638
PCT Pub. Date: Oct. 28, 2021

(65) Prior Publication Data
US 2023/0137288 A1 May 4, 2023

Related U.S. Application Data

(60) Provisional application No. 63/013,683, filed on Apr. 22, 2020.

(51) Int. Cl.
*G06T 7/62* (2017.01)
*G01N 15/08* (2006.01)
(Continued)

(52) U.S. Cl.
CPC ............. *G06T 7/62* (2017.01); *G01N 15/088* (2013.01); *G01N 33/241* (2013.01); *G06N 3/084* (2013.01);
(Continued)

(58) Field of Classification Search
CPC ......... G06T 7/62; G06T 7/11; G06T 2200/04; G06T 2207/10081; G06T 2207/20021;
(Continued)

(56) References Cited

U.S. PATENT DOCUMENTS 8,311,788 B2    11/2012    Hurley et al.
9,070,049 B2    6/2015    Fredrich et al.
(Continued)

FOREIGN PATENT DOCUMENTS

CN    105466899 A    4/2016
WO    2014142976 A1    9/2014

OTHER PUBLICATIONS

Office Action Received for Chinese Application No. 202180027962.4, Mailed on Feb. 5, 2025, 12 Pages(06 Pages of English Translation and 06 Pages of Official Copy).
(Continued)

*Primary Examiner* — Chan S Park
(74) *Attorney, Agent, or Firm* — SHELL USA, INC.

(57) ABSTRACT

The present invention provides a method for estimating fluid saturation of a hydrocarbon-bearing rock from a rock image. The image is segmented to represent either a pore space or solid material in the rock. An image pore volume is estimated from the segmented image, and a corrected pore volume is determined to account for the sub-resolution pore volume missing in the image of the rock. An image-derived wetting fluid saturation of the rock is estimated using a direct flow simulation on the rock image and corrected for the corrected pore volume. A backpropagation-enabled trained
(Continued)

model can be used to segment the image. A backpropagation-enabled method can be used to estimate the fluid saturation using an image selected from a series of 2D projection images, 3D reconstructed images and combinations thereof.

7 Claims, 1 Drawing Sheet

(51) Int. Cl.
  *G01N 33/24* (2006.01)
  *G06N 3/084* (2023.01)
  *G06T 7/11* (2017.01)

(52) U.S. Cl.
  CPC ........ *G06T 7/11* (2017.01); *G01N 2015/0846* (2013.01); *G01N 2223/616* (2013.01); *G01N 2223/649* (2013.01); *G06T 2200/04* (2013.01); *G06T 2207/10081* (2013.01); *G06T 2207/20021* (2013.01); *G06T 2207/20081* (2013.01)

(58) Field of Classification Search
  CPC .......... G06T 2207/20081; G06T 7/136; G01N 15/088; G01N 33/241; G01N 2015/0846; G01N 2223/616; G01N 2223/649; G01N 23/046; G06N 3/084
  See application file for complete search history.

(56) References Cited

U.S. PATENT DOCUMENTS

| | | | |
|---|---|---|---|
| 9,134,457 | B2 | 9/2015 | Hurley et al. |
| 10,235,758 | B2* | 3/2019 | Vernaza ............... G06N 3/045 |
| 10,466,386 | B2 | 11/2019 | Hurley |
| 2011/0066404 | A1 | 3/2011 | Salazar-Tio et al. |
| 2012/0275658 | A1 | 11/2012 | Hurley et al. |
| 2013/0018641 | A1 | 1/2013 | Prisco et al. |
| 2013/0152671 | A1 | 6/2013 | Sinha et al. |
| 2014/0044315 | A1 | 2/2014 | Derzhi et al. |
| 2015/0043787 | A1 | 2/2015 | Fredrich et al. |
| 2015/0347682 | A1* | 12/2015 | Chen ..................... G16H 50/20 705/2 |
| 2018/0121579 | A1 | 5/2018 | Fredrich et al. |
| 2018/0321127 | A1 | 11/2018 | León Carrera et al. |
| 2019/0154597 | A1* | 5/2019 | Zhang .................. G01N 15/088 |
| 2019/0212241 | A1* | 7/2019 | Crouse .................... G06F 30/20 |
| 2019/0391125 | A1* | 12/2019 | Cook ....................... G01N 33/24 |
| 2020/0191698 | A1* | 6/2020 | Saxena ................ G01N 23/046 |
| 2021/0223192 | A1* | 7/2021 | Heidari ................ G01R 33/448 |

OTHER PUBLICATIONS

International Search Report and Written Opinion received for PCT Patent Application No. PCT/US2021/028299, mailed on Aug. 24, 2021, 12 pages.
Saxena et al., "Rock Properties From Micro-ct Images: Digital Rock Transforms for Resolution, Pore Volume, and Field of View", Advances in Water Resources, vol. 134, Sep. 10, 2019, XP085905530.
Hilpert et al., "Pore-morphology-based Simulation of Drainage in Totally Wetting Porous Media", Advances in Water Resources, Feb.-Mar. 2001, vol. 24, Issue No. 3-4, pp. 243-255.
Saxena et al., "Estimating Pore Volume of Rocks from Pore-Scale Imaging", Transport in Porous Media, vol. 129, Issue No. 1, May 11, 2019, pp. 403-412.
Alpak et al., "Prediction of Fluid Topology and Relative Permeability in Imbibition in Sandstone Rock by Direct Numerical Simulation", Advances in Water Resources, Dec. 2018, vol. 122, pp. 49-59.
Alpak et al., "Direct Simulation of Pore-scale Two-phase Viscocapillary Flow on Large Digital Rock Images Using a Phase-field Lattice Boltzmann Method on General-purpose Graphics Processing Units", Computational Geosciences, Oct. 1, 2019, vol. 23, Issue No. 5, pp. 849-880.
Otsu, "A Threshold Selection Method From Gray-level Histograms", IEEE Transactions on Systems, Jan. 1979, vol. Smc-9, Issue No. 1, pp. 62-66.
Andrä et al., "Digital Rock Physics Benchmarks—part Ii: Computing Effective Properties", Computers & Geosciences, Jan. 2013, vol. 50, pp. 33-43.
Saxena et al., "Effect of Image Segmentation & Voxel Size on Micro-CT Computed Effective Transport & Elastic Properties", Marine and Petroleum Geology, vol. 86, Sep. 1, 2017, pp. 972-990.
Chuang et al., "Fuzzy C-means Clustering With Spatial Information for Image Segmentation", Computerized Medical Imaging and Graphics, vol. 30, Issue No. 1, Feb. 2006, pp. 9-15.
Amabeoku et al. "Evaluation and Application of Digital Rock Physics (Drp) for Special Core Analysis in Carbonate Formations", International Petroleum Technology Conference, Mar. 28, 2013, pp. 26-28, XP055580402.
Saxena et al., "Imaging and Computational Considerations for Image Computed Permeability: Operating Envelope of Digital Rock Physics", Advances in Water Resources, vol. 116, Apr. 4, 2018, pp. 127-144, XP085402086.
Sudakov et al., "Driving Digital Rock Towards Machine Learning: Predicting Permeability With Gradient Boosting and Deep Neural Networks", Mar. 16, 2018, pp. 1-15, XP055678933.
Zecevic et al., "Progress in Electron Tomography to Assess the 3d Nanostructure of Catalysts", Current Opinion in Solid State and Materials Science, vol. 17, 2013, pp. 115-125.
International Search Report and Written Opinion received for PCT Patent Application No. PCT/US2019/066543, mailed on Apr. 1, 2020, 13 pages.
International Search Report and Written Opinion received for PCT Patent Application No. PCT/US2020/064180, Mailed on Mar. 16, 2021, 11 Pages.
Garba et al., "Electrical Formation Factor of Clean Sand From Laboratory Measurements and Digital Rock Physics", Solid Earth Discuss, vol. 10, Issue No. 5, Jan. 1, 2019, pp. 1505-1517, XP055781308.
Lin et al., "Quantification of Sub-resolution Porosity in Carbonate Rocks by Applying High-salinity Contrast Brine Using X-ray Microtomography Differential Imaging", Advances in Waler Resources, vol. 96, Aug. 3, 2016, pp. 306-322, XP029723812.
Saxena et al., "Estimating Electrical Cemenlalion and Saturation Exponents Using Digital Rock Physics", Journal of Petroleum Science and Engineering, vol. 198, Dec. 3, 2020, XP086434571.
Archie, "Classification of Carbonate Reservoir Rocks and Pelrophysical Considerations", Bulletin of the American Associalion of Petroleum Geologists, vol. 36, Issue No. 2, Feb. 1, 1952, pp. 278-298.
Archie, "The Electrical Resistivity Log as an Aid in Determining Some Reservoir Characteristics", Transactions of the AIME, vol. 146, Issue No. 1, Dec. 1942, pp. 54-62.
Garboczi, "Finite Element and Finite Difference Programs for Computing the Linear Electric and Elastic Properties of Digital Images of Random Materials", NISTIR 6269, Dec. 1, 1998, 213 Pages.
International Search Report and Written Opinion received for PCT Patent Application No. PCT/US2019/066539, mailed on Apr. 1, 2020, 13 pages.

* cited by examiner

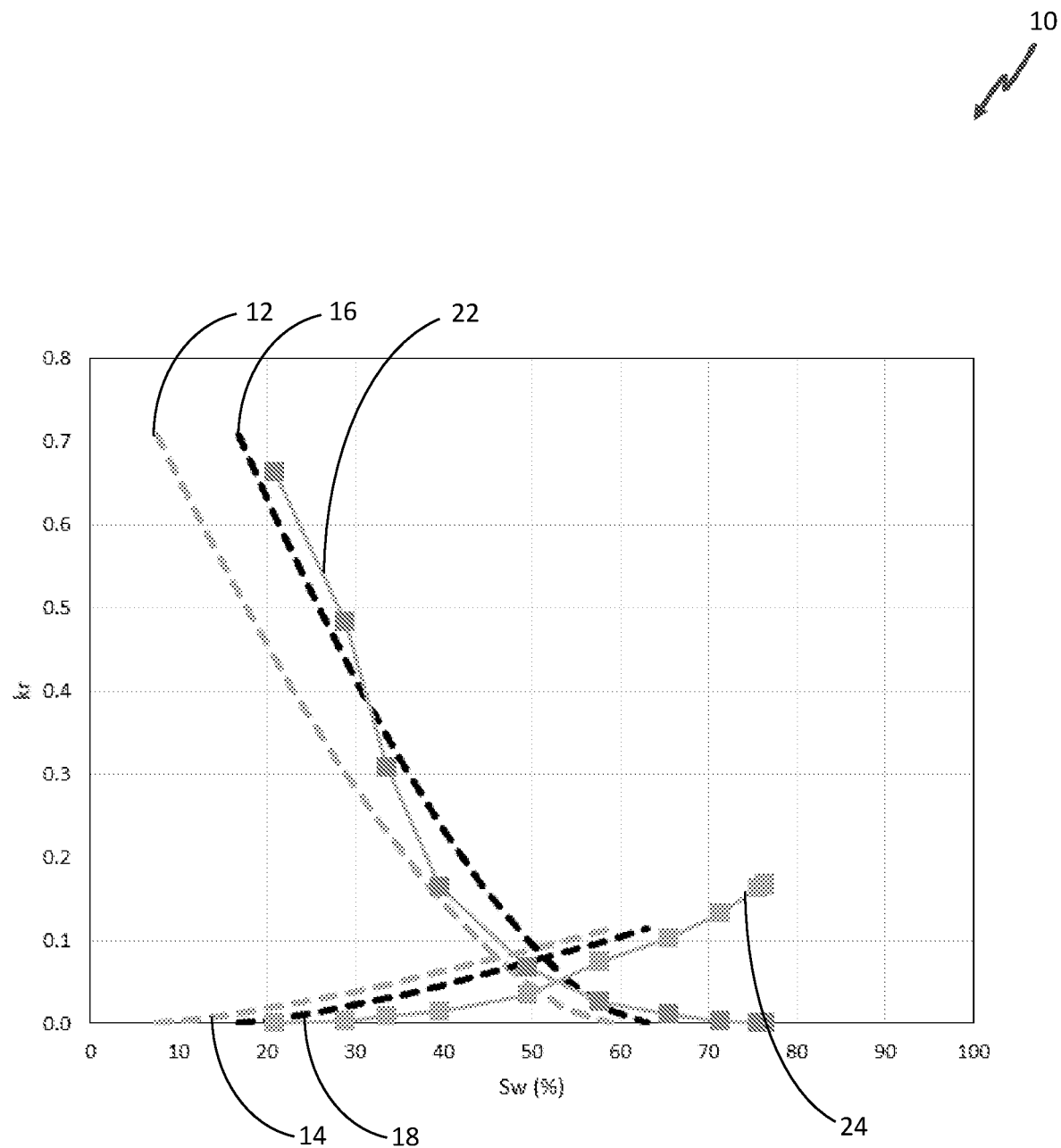

METHOD FOR ESTIMATING FLUID SATURATION OF A ROCK

CROSS REFERENCE TO RELATED APPLICATIONS

This is a National stage application of International application No PCT/US2021/028299, filed 21 Apr. 2021, which claims priority of U.S. application No. 63/013,683, filed 22 Apr. 2020 which is incorporated herein by reference in its entirety.

FIELD OF THE INVENTION

The present invention relates to a method of estimating fluid saturation of a rock, and, in particular, to a method of estimating fluid saturation of a rock from a 3D image of the rock.

BACKGROUND OF THE INVENTION

Accurate determination of fluid saturation within a hydrocarbon-containing reservoir is an important factor in determining whether to select the hydrocarbon-containing reservoir for development, as well as developing and managing the hydrocarbon-containing reservoir. Pore-scale flow simulation, based on an understanding of the dynamics of fluid displacement at the pore-scale, can facilitate computation of Darcy-scale flow parameters used as inputs, for example, in reservoir simulation. However, numerous factors influence fluid flow, including, for example, fluid density and viscosity, interfacial tension, fluid flow rate, surface wettability and pore geometry.

Laboratory tests for these factors, however, require substantial time and are quite expensive. Further, the number of samples that may be processed is relatively limited due to the time and expense required to conduct each test. There is a need for providing information more quickly in order to make more timely decisions. Many in the industry are turning to simulations of fluid flow in a reservoir for making informed decisions in a timely manner.

Digital rock physics is a technology that has been developed to provide faster, more, and less expensive analysis of hydrocarbon-containing formation rocks to determine key petrophysical characteristics of the rocks. Digital rock physics utilizes digital images of formation rocks to simulate rock multiphysics at the pore scale and to predict properties of complex rocks.

Accordingly, direct numerical simulations can be solved directly on complex pore space extracted, for example, from micron-scale X-ray computer tomography images. Alpak et al. ("Prediction of fluid topology and relative permeability in imbibition in sandstone rock by direct numerical simulation" *Advances in Water Resources* 122:49-59; 2018 and "Direct simulation of pore-scale two-phase visco-capillary flow on large digital rock images using a phase-field lattice Boltzmann method on general-purpose graphics processing units" *Computational Geosciences* 23:849-880; 2019) describe an energy-based LBM (eLBM) that is a two-phase flow simulation system composed of three modules: forced drainage simulation module, forced imbibition simulation module, and a steady-state relative permeability computation module.

Leon Carrera et al. (US2018/0321127A1) disclose a method for providing a numerical model of a sample of rock that, when used for flow simulations, reproduces porosity and permeability according to measurements taken in the sample of rock. Data recovered from a CT scan provides a statistical density function of an attenuation X-ray radiation in the volume of the rock sample. Porosity is populated for sub-volumes of a 3D model, wherein the porosity is spatially distributed among the cells of the sub-volume by means of a Gaussian simulation algorithm responsive to the porosity statistical distribution function as an approximation of a Gaussian density function. Permeability is populated among the cells as defined by a scalar function responsive to the porosity of the cell. A global permeability is obtained by performing a numerical simulation of the 3D model. Steps are repeated until the global permeability measured on a plug sample of rock and the global permeability calculated from the 3D model differ less than a threshold.

Fredrich et al. (U.S. Pat. No. 9,070,049B2 and WO2014/142976A1) relate to systems and methods for improving direct numerical simulation of material properties from rock samples. High resolution images are used to resolve its pore space. Fredrich et al. recognize that pore system heterogeneity may not always be well represented within a small imaged portion of a rock, resulting in error in the computed material properties due to lack of pore system representativeness. Accordingly, Fredrich et al. identify a representative elementary volume ("REV") determined by selecting a test volume and an adjacent volume and calculating a difference in a petrophysical property values for the adjacent volumes.

Digital rock physics modelling conventionally has relied on an assumption that the pore volume of hydrocarbon-containing rocks is accurately determined from micron-scale images. However, the images are limited in resolution and thus a significant portion of rock pore volume can remain unresolved.

For example, as discussed in Saxena et al, 2019 ("Estimating Pore Volume of Rocks from Pore-Scale Imaging" *Transport in Porous Media* 129: 403-412; 2019), due to current resolution limit of micron-scale images generated by micro-CT detectors, up to half of the total pore volume can be missing in micron-scale X-ray computer tomography images of reservoir rocks. The missing pore volume is not accessible to direct numerical simulations which limits applicability of Digital Rock to infer true residual saturation of reservoir fluids. To derive meaningful results from direct simulations, at minimum, raw fluid saturation inferred from simulations on micron-scale images must be corrected for the missing pore volume.

There is a need for correctly parameterizing direct simulations of fluid flow to include the impact of sub-resolution pore volume to correct inferred fluid saturation from direct simulations of fluid flow.

SUMMARY OF THE INVENTION

According to one aspect of the present invention, there is provided a method for estimating fluid saturation of a hydrocarbon-bearing rock from a rock image, comprising: obtaining a 3D image of a rock from the hydrocarbon-bearing formation in the field, wherein the 3D image is comprised of a plurality of voxels and the 3D image has a resolution; processing the 3D image to segment the 3D image by selecting each voxel of the 3D image to represent either a pore space in the rock or solid material in the rock; estimating an image pore volume of the rock from the segmented 3D image, the image pore volume lacking a sub-resolution pore volume of the rock; determining a corrected pore volume adapted to account for the sub-resolution pore volume of the rock; estimating an image-derived wetting fluid saturation of the rock using a direct flow simulation on the 3D image; and determining a corrected wetting fluid saturation of the rock from the image-derived wetting fluid saturation, the image pore volume and the corrected pore volume of the rock.

According to another aspect of the present invention, there is provided a backpropagation-enabled method for estimating a fluid saturation of a hydrocarbon-bearing rock, comprising the steps of: obtaining a 3D image of a rock from the hydrocarbon-bearing formation in the field, the 3D image having a resolution; applying a backpropagation-enabled trained model to segment the 3D image; estimating an image pore volume of the rock from the segmented 3D image, the image pore volume lacking a sub-resolution pore volume of the rock; determining a corrected pore volume adapted to account for the sub-resolution pore volume of the rock; estimating an image-derived wetting fluid saturation of the rock using a direct flow simulation on the 3D image; and determining a corrected wetting fluid saturation of the rock from the image-derived wetting fluid saturation, the image pore volume and the corrected pore volume of the rock.

According to a further aspect of the present invention, there is provided a backpropagation-enabled method for estimating a fluid saturation of rock from an image of rock, comprising the steps of: obtaining an image of rock from the hydrocarbon-bearing formation in the field, the image selected from the group consisting of a series of 2D projection images, 3D reconstructed images and combinations thereof; and applying a backpropagation-enabled trained model to obtain a fluid saturation of the rock.

BRIEF DESCRIPTION OF THE DRAWING

The present invention will be better understood by referring to the following detailed description of preferred embodiments and the drawing referenced therein, in which:

The FIGURE is a graphical representation of relative permeability vs. fluid saturation for oil and water phases, illustrating imbibition of a test rock volume.

DETAILED DESCRIPTION OF THE INVENTION

In accordance with the method of the present invention, fluid saturation of a rock can be estimated more quickly from direct simulations of fluid flow in 3D images than conducting laboratory measurements. Furthermore, the direction simulations of fluid flow are more accurate by accounting for missing pore volume in segmented 3D images.

Specifically, the method of present invention estimates fluid saturation based on an image pore volume, a corrected pore volume of rock, and a wetting fluid saturation of rock derived from direct simulations of a 3D rock image. More specifically, a meaningful estimate of the fluid saturation is determined by correcting an image-derived wetting fluid saturation determined from micron-scale images. In a preferred embodiment, the image-derived wetting fluid saturation is corrected for sub-resolution pore volume missing from lower resolution images.

The present inventors have surprisingly discovered that capillary physics in rocks can be used to quantify the impact of image resolution on pore volume. This discovery enables Digital Rock or Digital Rock Physics to provide capability to determine a wetting fluid saturation from 3D images of rocks generated by micro-CT technology. Advantageously, the corrected wetting fluid saturation, and therefore fluid saturation, compensates for the limited image resolution without the need for higher resolution imaging that is only possible at the expense of image field of view or physical laboratory measurement.

The present invention provides a method for more accurately estimating fluid saturation of a rock based on an original 3D pore-scale image of the rock having limited resolution relative to the actual pore structure of the rock. Contrary to current assumptions in digital rock physics modelling, the inventors recognized that a substantial fraction of the pore volume of hydrocarbon-containing rocks is contained in pores of a size below the image resolution provided by 3D pore-scale imaging technology commonly used to provide images of such rocks. As a result, conventional digital rock physics modelling substantially underpredicts the effective wetting fluid saturation of the rock, and therefore the fluid saturation, by failing to account for pores that are smaller than the image resolution of the pore-scale imaging technology.

The present invention also provides a backpropagation-enabled method for estimating the fluid saturation of rock from a 3D image of rock. A backpropagation-enabled trained model is applied to a 3D image to segment the 3D image of rock.

In a preferred embodiment, the trained model is produced by providing a training set of images of rock, segmenting the images into a plurality of labeled voxels, the plurality of labeled voxels representing pore spaces and solid material in the rock, and using the labeled voxels to train a model via backpropagation.

The training set of images of rock may include, for example, 2D projection images obtained from a pore-scale imaging technology, 3D images reconstructed from 2D projection images, synthetic 2D images, synthetic 3D images, and combinations thereof. In a preferred embodiment, the training set of images is obtained from a cloud-based tool adapted to store 2D projection images from a pore-space imaging technology, especially micro-CT and thin sections. The tool is adapted to process the 2D projection images to produce a reconstructed 3D image. The tool is also adapted to store the resulting 3D images.

Examples of backpropagation-enabled processes include, without limitation, artificial intelligence, machine learning, and deep learning. It will be understood by those skilled in the art that advances in backpropagation-enabled processes continue rapidly. The method of the present invention is expected to be applicable to those advances even if under a different name. Accordingly, the method of the present invention is applicable to the further advances in backpropagation-enabled processes, even if not expressly named herein.

A preferred embodiment of a backpropagation-enabled process is a deep learning process, including, but not limited to a convolutional neural network.

The backpropagation-enabled process may be supervised, semi-supervised, unsupervised or a combination thereof. In one embodiment, a supervised process is made semi-supervised by the addition of an unsupervised technique.

In a supervised backpropagation-enabled process, the training set of images is labeled to provide examples of pore spaces and solid material of interest. In an unsupervised backpropagation-enabled process, a pore space and/or solid material of interest may be identified by, for example, drawing a polygon around the image of interest in the image. The trained process will then identify areas of interest having similar latent space characteristics. When the training set is labeled images, the labels may have a dimension of 1D-3D.

In one embodiment, the supervised backpropagation-enabled process is a classification process. The classification process may be conducted voxel-wise, slice-wise and/or volume-wise.

In another embodiment, the unsupervised backpropagation-enabled process is a clustering process. The clustering process may be conducted voxel-wise, slice-wise and/or volume-wise.

In another embodiment, the unsupervised backpropagation-enabled process is a generative process. The generative process may be conducted voxel-wise, slice-wise and/or volume-wise.

Preferably, the backpropagation-enabled process is a segmentation process.

In a preferred embodiment, the training step includes validation and testing.

In the method of the present invention, petrophysical characteristics of a rock, particularly the fluid saturation of the rock, may be estimated from an image of the rock. The rock image is obtained from a rock from the hydrocarbon-containing formation for which the petrophysical characteristics of the formation, or portion thereof, are of interest. Preferably, the rock may be a sandstone, a carbonate, a shale and combinations thereof from a hydrocarbon-containing formation. The rock may be obtained by conventional means for obtaining rock samples from a hydrocarbon formation. In a preferred embodiment, a core sample of the rock is obtained by coring a portion of the formation from within a well in the formation. Alternatively, a sample of the rock may be obtained from drill cuttings produced in drilling a well in the formation. The rock may be obtained from the same wellbore as the resistivity log. Alternatively, the rock may be obtained from another wellbore in the same field as the wellbore for which the resistivity log was produced.

The rock sample should be of sufficient size to obtain a 3D image of sufficient volume at the scale that the image is generated. In particular, the rock sample should be of sufficient size such that characteristics of the bulk of the sample predominate over the characteristics of the edges of the sample at the scale or field of view of the image to be generated.

A 3D image comprised of a plurality of voxels is obtained from the rock sample. The 3D image of the rock may be obtained utilizing pore-scale imaging technology. A 3D image of the rock may be obtained by x-ray computer tomography, including, without limitation, x-ray micro-computed tomography (micro-CT) and x-ray nano-computed tomography (nano-CT), acoustic microscopy, or magnetic resonance imaging Most preferably, the 3D image of the rock is obtained by micro-CT to provide sufficient field of view of the rock to avoid edge pores distorting the overall pore volume of the resulting image, as well as to reduce scanning time and computational requirements that higher resolution tomography (e.g. nano-CT) would require.

In a preferred embodiment, the 3D image is obtained from a cloud-based tool adapted to store 2D projection images from a pore-space imaging technology, especially micro-CT and thin sections. The tool is adapted to process the 2D projection images to produce a reconstructed 3D image. The tool is also adapted to store the resulting 3D images.

The 3D image of the rock obtained by pore-scale imaging technology has a resolution. The voxels of the 3D image define the resolution of the image. The image is comprised of a plurality of voxels, where the volume defined by each voxel represents a maximum resolution of the image. The resolution of the image should be selected to provide a voxel size at which the dominant pore throats for fluid flow in the rock are sufficiently resolved and at which a sufficient field of view is provided so as to be representative of the whole rock for a given petrophysical property to be analyzed (e.g. pore volume and fluid saturation). For purposes herein, the dominant pore throat size ($D_d$) is the size of pore throats of pores that a non-wetting liquid enters at the pore entry pressure ($P_d$), where the pore entry pressure is the minimum pressure required before the non-wetting liquid can begin to invade the pore structure of the rock.

The resolution of a micro-CT image may be chosen based on the size of the rock sample, the relative average pore size of the type of rock, the time required for the imaging, and the computational power required to store and conduct further computational activity on the image data. The image resolution is chosen to be detailed enough that a non-wetting liquid capillary injection curve can be plotted based on a segmented image produced from the image while maintaining a sufficient field of view to avoid edge pores distorting the overall pore volume of the resulting image. In a preferred embodiment, the image resolution is selected to require as little computational power to store and conduct further computational activity on the image while providing sufficient detail to construct a capillary injection curve based on the segmented image. The image resolution may be selected based on the type of rock, where sandstones generally have a larger pore structure than carbonates, and require less image resolution than carbonates, and carbonates have a larger pore structure than shales, and require less image resolution than shales. The resolution of the micro-CT image may range from 0.1 $\mu m^3$ to 30 $\mu m^3$ per voxel. For sandstones, the micro-CT image preferably is produced at a resolution of from 1 $\mu m^3$ to 25 $\mu m^3$ per voxel, or from 2.5 $\mu m^3$ to 15 $\mu m^3$ per voxel; for carbonates the resolution of the micro-CT image is preferably in a range from 0.5 $\mu m^3$ to 20 $\mu m^3$, or from 1 $\mu m^3$ to 10 $\mu m^3$; and for shales the resolution of the micro-CT (or nano-CT) image is preferably in a range from 0.1 $\mu m^3$ to 10 $\mu m^3$, or from 0.5 $\mu m^3$ to 5 $\mu m^3$.

In a preferred embodiment, the acquired image may be processed to reduce noise and image artifacts. Noise may be filtered from the acquired image by filtering using a local means filter to reduce noise Imaging artifacts, predominant at the outer edges of the acquired image, may be reduced by processing the image while excluding the outer edges of the image.

The 3D image obtained for the rock is processed to segment the voxels of the image into voxels representing either pore space in the rock or solid material in the rock, thereby producing a binary image in which pore voxels have a value of 0 and solid material voxels have a value of 1 (or vice versa). The image may be a grayscale image, and processing the voxels of the image to segment the image into voxels representing pore space or solid material may be effected by assigning a voxel a designation as pore space or as solid material based on a threshold, wherein voxels having an image intensity above the threshold may be assigned a value representing a pore (or solid material) and voxels having an image intensity below the threshold may be assigned a value representing solid material (or a pore). A threshold may be calculated using Otsu's method as described in Otsu ("A Threshold Selection Method from Gray-level Histogram" *IEEE Trans. SMC* 9:62-66; 1979), or other threshold calculation algorithms known in the art.

The 3D image of the rock may be processed to segment the voxels into pore space voxels and solid material voxels utilizing segmentation algorithms known in the art. Preferably, the segmentation method is selected to differentiate conductive pores from non-conductive minerals. Examples of segmentation methods are described in Otsu (1979), Andra et al ("Digital Rock Physics Benchmarks-Part II: Computing Effective Properties" *Computers and Geosciences* 50:33-43; 2013), Saxena et al ("Effect of Image Segmentation & Voxel Size on Micro-CT Computed Effective Transport & Elastic Properties" *Marine and Petroleum Geology* 86:972-990; 2019), and Chuang et al ("Fuzzy C-Means Clustering with Spatial Information for Image Segmentation" *Comput. Med. Imaging Graph.* 30:9-15; 2006). The desired selection of segmentation will be understood by those skilled in the art. Segmentation using segmentation algorithms is preferably conducted automatically using data processing systems.

After the image has been segmented, an image-derived pore volume, $\phi_I$, is estimated from the segmented 3D image of the rock. The image pore volume of the rock may be estimated by summing the number of voxels in the segmented image that represent pore space, summing the total number of voxels in the segmented image (or obtaining the total number of voxels from the imaging parameters), then dividing the sum of the number of voxels in the segmented image that represent pore space by the total number of voxels in the segmented image. A sum of the number of voxels in the segmented image that represent pore space may be determined by adding up the number of voxels assigned a binary value (e.g. 1 or 0) representing pore space. A sum of the total number of voxels in the segmented image may be determined by adding up the total number of voxels assigned a binary value, both pore space voxels and solid material voxels. The image pore volume lacks a sub-resolution pore volume of the rock.

In accordance with the present invention, a corrected pore volume adapted to account for the sub-resolution pore volume of the rock is determined. In one embodiment of the present invention, a corrected pore volume is measured using a conventional laboratory measurement. In another embodiment of the present invention, a corrected pore volume is determined by applying a correction factor to the image pore volume, for example by estimating the actual pore volume ($\phi_\infty$) using image-derived pore volume ($\phi_I$), and an image-derived correction factor ($\alpha_R$):

$$\phi_\infty = \phi_I / \alpha_R \qquad (1)$$

The correction factor may be estimated by a transform. In a preferred embodiment, the correction factor is determined by determining a non-wetting liquid capillary pressure curve from the segmented 3D image of the rock for pores distinguishable in the segmented image at pressures up to an image-limited pressure. Preferably, mercury or Wood's metal is selected as the non-wetting liquid. A non-wetting liquid capillary pressure curve may be determined from the segmented image by plotting the porosity of the rock occupied by the non-wetting liquid at selected pressures up to the image-limiting pressure based upon simulations of the non-wetting liquid filling the pore space of the image.

The expression for correction factor ($\alpha_R$) depends on the choice of Mercury Injection Capillary Pressure (MICP) model. For a Thomeer's model of the Capillary Pressure Curve, $\alpha_R$ is given by:

$$\alpha_R = e^{\frac{-G}{\log_{10}(N)}} \qquad (2)$$

where G is the pore geometry factor that captures the shape of the MICP curve and N is the pore throat resolution parameter.

The pore resolution parameter N is determined from the non-wetting liquid capillary pressure curve derived from the image and the image resolution as determined from the size of the voxels. The pore resolution parameter Dd is the ratio of the pore throat size (Dd) entered by the non-wetting liquid at the entry pressure (Pd) to the size of the voxels ($\Delta x$), N=(Dd/$\Delta x$). The size of the voxels may be determined from the parameters of the 3D imaging (i.e. the resolution of the image). The pore throat size (Dd) of pores entered by the non-wetting liquid at entry pressure (Pd) may be determined from the non-wetting liquid capillary pressure curve derived from the segmented 3D image of the rock according to the equation:

$$Dd = 4\sigma \cos \theta / Pd \qquad (3)$$

The pore geometry factor G is determined from the non-wetting liquid capillary pressure curve derived from the image. The pore geometry factor G may be determined by plotting a best fit curve to the non-wetting liquid capillary pressure curve simulated from the segmented image and determining the pore geometry factor from the shape of the curve. The best fit curve may be plotted by the least squares method or by any conventional curve-fitting method.

Parameter G, which increases with pore volume complexity, is precisely 0 for pipes, approximately 0.1-0.3 for sandstones, and approximately 0.3-0.5 for carbonates. The parameters N, G, and $\alpha_R$, can also be estimated directly from a 3D image of limited resolution, without the need of a laboratory measurement, by analyzing the response of digitally simulated mercury injection.

To derive meaningful results from direct simulations, and in accordance with the present invention, raw fluid saturation inferred from simulations on micron-scale images is corrected for the missing pore volume.

The following expression relates the portion of rock pore volume occupied by mercury to the number of voxels ($\xi$) available to resolve the pore throats that were last penetrated during a MICP simulation at a given capillary pressure P:

$$\phi(\xi) = \alpha(\xi) \phi_\infty \qquad (4)$$

where $$\xi = \frac{D(P)}{\Delta x} = \frac{4\sigma \cos\theta}{\Delta x P} \qquad (5)$$

In equation (5), $\Delta x$ is image voxel size, D (P) is pore throat size penetrated at a given pressure P in a MICP simulation, $\sigma$ is mercury-air surface tension and $\theta$ is the contact angle. If all the pore throats are invaded, then $\xi=1$ and thus the pore volume accessed by mercury will be equal to pore volume of the image, i.e., $\phi(1)=\phi_I$ and $\alpha(1)=\alpha_R$. The expression for $\alpha(\xi)$ depends on the type of MICP model that best describes the behavior of the simulation curve. For Thomeer's MICP, functional form $\alpha(\xi)$ is given by $$\alpha(\xi) = e^{\frac{-G}{\log_{10}(N/\xi)}} \qquad (6)$$

The corresponding expression for Brooks-Corey fit is expressed by $$\alpha(\xi) = 1 - \left(\frac{N}{\xi}\right)^{-\lambda} \qquad (7)$$

where $\lambda$ is a fitting parameter like parameter G.

Using equation (4), the saturation of air in a MICP simulation is related to the $\xi$ value:

$$S_{wI}(\xi) = 1 - S_{nwI}(\xi) = 1 - \frac{V_{nwI}}{\phi_I} = 1 - \frac{\alpha(\xi)}{\alpha(1)} \quad (8)$$

where, $S_{wI}$ and $S_{nwI}$ are image-derived saturations for the wetting (air; denoted by subscript w) and non-wetting phases (mercury; denoted by subscript nw), respectively. Symbol $V_{nwI}$ denotes the fractional bulk volume occupied by mercury in the image. The corresponding expressions for fluid saturations with respect to true rock pore volume ($\phi_\infty$) are given by:

$$S_{w\infty}(\xi) = 1 - S_{nw\infty}(\xi) = 1 - \frac{V_{nwI}}{\phi_\infty} = 1 - \alpha(\xi) \quad (9)$$

Equations (8) and (9) assume that the volume of mercury estimated from direct simulations is accurate for pores and pore throats corresponding to sufficiently large values of $\xi$. Using these equations, the image-derived wetting fluid saturation is transformed to a corrected true wetting fluid saturation:

$$S_{w\infty}(\xi) = 1 - (1 - S_{wI}(\xi))\alpha(1) \text{(Drainage)} \quad (10)$$

Equations (8)-(10) assume all the unresolved porosity is filled with wetting phase (corresponding to a strong water-wet or a strong oil-wet condition). For a drainage process, we can assume the rock is substantially water-wet, thus the previous assumption is valid and Equation (10) can be applied to drainage process. However, for an imbibition process, due to presence of hydrocarbons, mixed wettability can be developed in the rock. At this condition, the unresolved porosity cannot be assumed to be only filled with one type of fluid. It is not yet clear what percentage of fluid exist in unresolved pores. As an initial estimate, the average between $\alpha(1)$ and 1 can be used:

$$S_{w\infty}(\xi) = 1 - (1 - S_{wI}(\xi))\alpha_{imb} \text{(Imbibition)} \quad (11)$$

where, $\alpha_{imb}$ is average value between $\alpha(1)$ and 1.

Equations (10) and (11) represents the inventors' recognition that image-derived properties, especially for lower resolution images, do not match those measured in the laboratory. The inventors recognized that, without correcting for missing sub-resolution pore volume, because $\phi_I < \phi_\infty$, the fluid flow derived from direct flow simulation using the segmented micro-CT image is underpredicted.

If a sandstone reservoir rock (e.g., G=0.2) is moderately resolved (e.g., N=5) and the image inferred air saturation is low (e.g., $S_{wI}$=0.4), then $\alpha(1)$=0.75 and thus the corrected air saturation will be $S_{w\infty}$=0.55. This illustrates that corrections to image derived fluid saturation is critical prior to comparing any simulation results with laboratory measurements. In other words, saturation $S_{w\infty}$ is comparable to laboratory measured saturation, while raw image saturation $S_{wI}$ is not.

The parameters (N, G, and $\lambda$) can be derived directly from the segmented image as described in Saxena et al. ("Estimating Pore Volume of Rocks from Pore-Scale Imaging" *Transport in Porous Media* 129: 403-412; 2019). Comparing raw MICP simulation results (image-derived fluid volumes normalized by resolved porosity in 3D images of rocks) with those measured in the laboratory can lead to false negative comparison.

Pore throats corresponding to larger values of $\xi$ are better resolved from an imaging perspective and thus also segmented with higher confidence. For any direct simulation, fluid saturation corresponding to larger values of $\xi$ will have higher fidelity compared to those estimated for lower values of $\xi$. If $\xi$=2, then only 2 voxels (in 1-dimension) are available for the non-wetting fluid to penetrate. As a result, the associated fluid volume within such poorly resolved pores will remain uncertain and thus the associated fluid distribution within these narrow pore throats will not be accurately captured by direct simulation. To ensure $\xi \geq 2$, the following inequalities need to be satisfied:

$$S_{wI} \geq 1 - \frac{\alpha(2)}{\alpha(1)} \text{ or } S_{nwI} \leq \frac{\alpha(2)}{\alpha(1)} \quad (12)$$

and $$S_{w\infty} \geq 1 - \alpha(2) \text{ or } S_{nw\infty} \leq \alpha(2) \quad (13)$$

Inequalities in equations (12) and (13) follow directly from the results in equations (8) and (9). Yet another aspect to consider prior to comparing image simulation derived wetting/non-wetting fluid (e.g., air/mercury) saturations to those measured in the laboratory is the pressure value at which the non-wetting fluid begins to enter a digital rock. In a numerical simulation, the non-wetting fluid first enters a digital rock sample via "outer" pore bodies instead of pore throats because they can be accessed at much lower pressure compared to the pore throats—compensating for the biases in pressure and volume introduced by the outer pore bodies to flow properties is referred to here as a closure correction. Although this phenomenon also occurs in a physical MICP measurement, the volumetric contributions of the outer pore body is negligible compared to the total volume of the non-wetting fluid injected in the physical sample simply due to considerably larger sample size. Therefore, in a primary drainage simulation, pressure and flow data are only meaningful after the outer pore bodies are filled with the non-wetting fluid (e.g., mercury). This condition is guaranteed if:

$$S_{wI} \leq 1 - \frac{V_{closure}}{\phi_I} \text{ or } S_{nwI} \geq \frac{V_{closure}}{\phi_1} \quad (14)$$

and $$S_{w\infty} \leq 1 - \frac{V_{closure}}{\phi_\infty} \text{ or } S_{nw\infty} \geq \frac{V_{closure}}{\phi_\infty} \quad (15)$$

The saturation cutoffs in equations (12) and (13) are related to image voxel size, namely, the finer the voxel size, the larger the parameter N, and thus less restrictive the cutoffs. Meanwhile, the saturation cutoffs in equations (14) and (15) are related to field of view, wherein the larger the field of view, the smaller the value of $V_{closure}$ and, thus less restrictive the cutoffs.

In another embodiment, the image resolution related saturation cutoffs, in equations (12) and (13), could be relaxed by re-imaging the rock sample at a finer voxel size. However, this would further restrict the saturation cutoffs related to field of view because state-of-the-art micro-CT detectors can only capture a limited number of voxels (typically fewer than 5000×5000×5000 voxels) and can only image at finer voxel size (thus increasing the value of parameter N) at the expense of field of view (resulting in larger value of $V_{closure}$).

Multiphase flow is a complex phenomenon with interplay between viscous and capillary forces at micron scale. The degree to which the pore space is resolved further complicates numerical simulation of this interplay between the two forces and thus can negatively impact interpretation of simulation results. Any constraints imposed by missing pore volume must be accounted for prior to comparing results of direct numerical simulations with laboratory measured data. In accordance with the method of the present invention, fluid saturation inferred using direct flow simulations is corrected for sub-resolution pore volume to recover the true saturation.

In an embodiment of the invention, the method of the present invention is used for producing a correction for brine saturation inferred from direct numerical simulation of multiphase flow using segmented micro-CT images.

For example, the simulation may be limited to primary drainage of non-wetting oil phase into rocks that are perfectly water-wet. Note that the results in equations (10)-(14) are independent of surface tension and wetting angle, and thus are applicable to primary drainage of other fluid systems (e.g., water-oil). However, the corrections assume that the non-wetting fluid (oil) cannot enter any sub-resolution pores, and thus are not applicable if the non-wetting phase would have otherwise invaded the sub-resolution pore volume if only the simulation was performed on the same field of view imaged at infinite resolution so that all pores were accessible to the numerical simulator.

A 3D micro-CT image is obtained with image and voxel sizes. The 3D image is processed to segment the 3D image by selecting each voxel of the image to represent either a pore space in the rock or solid material in the rock.

The image porosity is determined from the segmented three-dimensional image of the rock by summing the number of voxels representing pore space in the segmented image and dividing by the total number of voxels in the image as determined from the imaging parameters.

Mercury capillary injection curves are then determined from the segmented 3D images of the rock. An image-based curve is created by plotting the fractional bulk volume of each segmented rock image occupied against pressure in accordance with equation (3).

A pore throat resolution parameter N is determined from the mercury capillary injection curve and the voxel size. The pore throat size entered by mercury at the entry pressure (Dd) is determined from the mercury capillary injection curve and equation (3) and the pore throat resolution parameter $N=Dd/\Delta x$ is calculated.

A pore geometric factor G and/or a Brooks-Corey fitting parameter 2 is determined from the mercury capillary injection curve by curve fitting with a least square curve fitting, with higher weight given to pores that are better resolved in the image. Utilizing G and/or $\lambda$, the pore volume correction factor ($\alpha_R$) and the corrected pore volume of the rock sample ($\phi_\infty$) is calculated, providing, for example, an indication of the underestimation of true pore volume from the image pore volume.

A proprietary direct pore-scale eLBM flow simulator is used to numerically compute relative permeability. The direct flow simulator accounts for drainage-imbibition hysteresis. This method represents a steady-state type of displacement approach to relative permeability computation. A forced-drainage process is simulated first. In the forced-drainage process, the in-situ wetting phase fully saturating the pore space is displaced by an injected non-wetting phase. The rock model is fully saturated by the wetting phase. The drainage process was simulated assuming water-wet behavior (constant contact angle of 40 degrees). A buffer layer saturated with oil is placed to the inlet, and one saturated with water is placed to the outlet. Oil is injected from the inlet buffer layer into the pore space with a constant prescribed velocity until the average water saturation in the pore space does not exhibit an appreciable change (convergence), at which time the drainage calculations are terminated.

Note that the water saturation achieved in this way may not necessarily correspond to the irreducible or connate water saturation of a representative elementary volume, as the viscous pressure drop achieved in a rather small computational domain size (much smaller than a core plug) is significantly less than capillary pressure established in the porous plate or centrifuge method corresponding to the saturation height in an oil reservoir.

Snapshots of the fluid configuration at different average water saturation values are used for the drainage relative permeability calculations. The post-drainage fluid configuration is then used as the initial state for the forced-imbibition simulation where the non-wetting phase is displaced by the wetting phase. The fluids in the inlet and outlet buffers are interchanged prior to the forced-imbibition calculations. The forced-imbibition calculations are continued again until average water saturation in the porous domain converges.

The fluid configuration snapshots at different average water saturation values acquired during forced-imbibition simulations are then used for relative permeability computations. In order to ensure steady-state conditions in the relative permeability computation, for a given saturation snapshot, calculations are performed using the loop-type periodic boundary conditions imposed on all faces of the domain. The full mirroring of the porous domain in the main flow direction is applied such that the periodic boundary condition is fully honored on the outlet face of the domain. The system is then driven to steady state, which closely mimics the steady-state relative permeability experiment.

Upon convergence of the system to steady state, effective wetting and non-wetting phase permeabilities computed by eLBM are normalized by the absolute permeability computed with an accurate and efficient MRT-LBM code (Alpak et al. "Prediction of fluid topology and relative permeability in imbibition in sandstone rock by direct numerical simulation" *Advances in Water Resources* 122:49-59; 2018) prior to the relative permeability simulation. The fluxes used for computing effective wetting and non-wetting phase permeabilities are derived by monitoring the average velocities of wetting and non-wetting phases, respectively, over the part of the domain that corresponds to the porous rock. In other words, buffers are excluded from the flux calculations. Relatively longer buffers are used for forced-drainage and especially imbibition process simulations, when the intent is to use the resulting fluid configurations for subsequent relative permeability calculations, to minimize the boundary effects. Moreover, an additional ring of the internal (rock) domain neighboring the buffers can be excluded from the effective property calculations to further minimize the boundary effects. This approach is typically used for the forced-imbibition simulations.

The process is then repeated for all saturation snapshots that cover the saturation range observed during the forced-drainage or forced-imbibition process. The relative permeability computation process is accurate, physically robust, and computationally quite demanding. The computational demand directly scales with the saturation resolution (i.e., the number of saturation snapshots) required to accurately capture the relative permeability functions.

The pressure and volume cutoffs are calculated by equations (12) to (15) for a predetermined voxel size, providing a non-wetting phase $V_{closure}$ and a non wetting phase $V_{nw}$.

EXAMPLE

The following non-limiting example of an embodiment of the method of the present invention as claimed herein is provided for illustrative purposes only. The example illustrates an application of saturation transform. In the FIGURE, relative permeability is plotted against fluid saturation for brine (wetting phase) and hydrocarbon (non-wetting phase). The raw result from imbibition direct simulation of a test rock volume is shown in dashed lines 12 and 14 for the oil curve and water curve, respectively. The raw simulation data is then transformed by applying correction for saturation, using equation (11), to the fluid saturation inferred from the simulation results between the saturation cutoffs. After saturation correction, the transformed simulation result (lines 16, 18 for oil and water respectively) is consistent with laboratory measured steady state relative permeability (lines 22, 24 for oil and water respectively) of a plug from the same well.

The method of the present invention provides more accurate estimations of fluid saturation, as well as continuous saturation profiles derived therefrom, are particularly suitable for exploration and production decisions, and field appraisals. The method of the present invention enables quick decision-making. For example, a process for estimating hydrocarbon saturation using physical measurements of a rock sample may take in the order of 7 to 8 months, while the method of the present invention can provide substantially the same or better accuracy in a matter of days.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

We claim:

1. A method for estimating fluid saturation of a hydrocarbon-bearing rock from a rock image, comprising:
   obtaining a 3D image of a rock from the hydrocarbon-bearing formation in a field, wherein the 3D image is comprised of a plurality of voxels and the 3D image has a resolution;
   processing the 3D image to segment the 3D image by selecting each voxel of the 3D image to represent either a pore space in the rock or solid material in the rock;
   estimating an image pore volume of the rock from the segmented 3D image, the image pore volume lacking a sub-resolution pore volume of the rock;
   determining a corrected pore volume adapted to account for the sub-resolution pore volume of the rock;
   estimating an image-derived wetting fluid saturation of the rock using a direct flow simulation on the 3D image; and
   determining a corrected wetting fluid saturation of the rock from the image-derived wetting fluid saturation, the image pore volume and the corrected pore volume of the rock.

2. The method of claim 1, wherein the 3D image of the rock is obtained by x-ray computer tomography.

3. The method of claim 1, wherein the rock is obtained from a hydrocarbon-bearing formation comprised of sandstone, carbonate, shale and combinations thereof.

4. The method of claim 1, wherein the corrected pore volume of the rock is determined by laboratory measurement.

5. The method of claim 1, wherein the corrected pore volume of the rock is determined by deriving a non-wetting liquid capillary pressure curve from the segmented 3D image of the rock; and determining the corrected pore volume from the segmented 3D image and the non-wetting liquid capillary pressure curve.

6. The method of claim 5, wherein the non-wetting liquid capillary pressure curve is derived from the segmented 3D image of the rock at pressures of up to an image-limited pressure, where the image-limited pressure is the minimum pressure that can be applied on the non-wetting liquid to overcome the capillary pressure of the narrowest pore throat distinguishable from the segmented 3D image of the rock.

7. The method of claim 1, wherein the 3D image is obtained from a cloud-based tool adapted to store and process 2D projection images from a pore-scale imaging technology.

* * * * *